United States Patent Office 3,317,449
Patented May 2, 1967

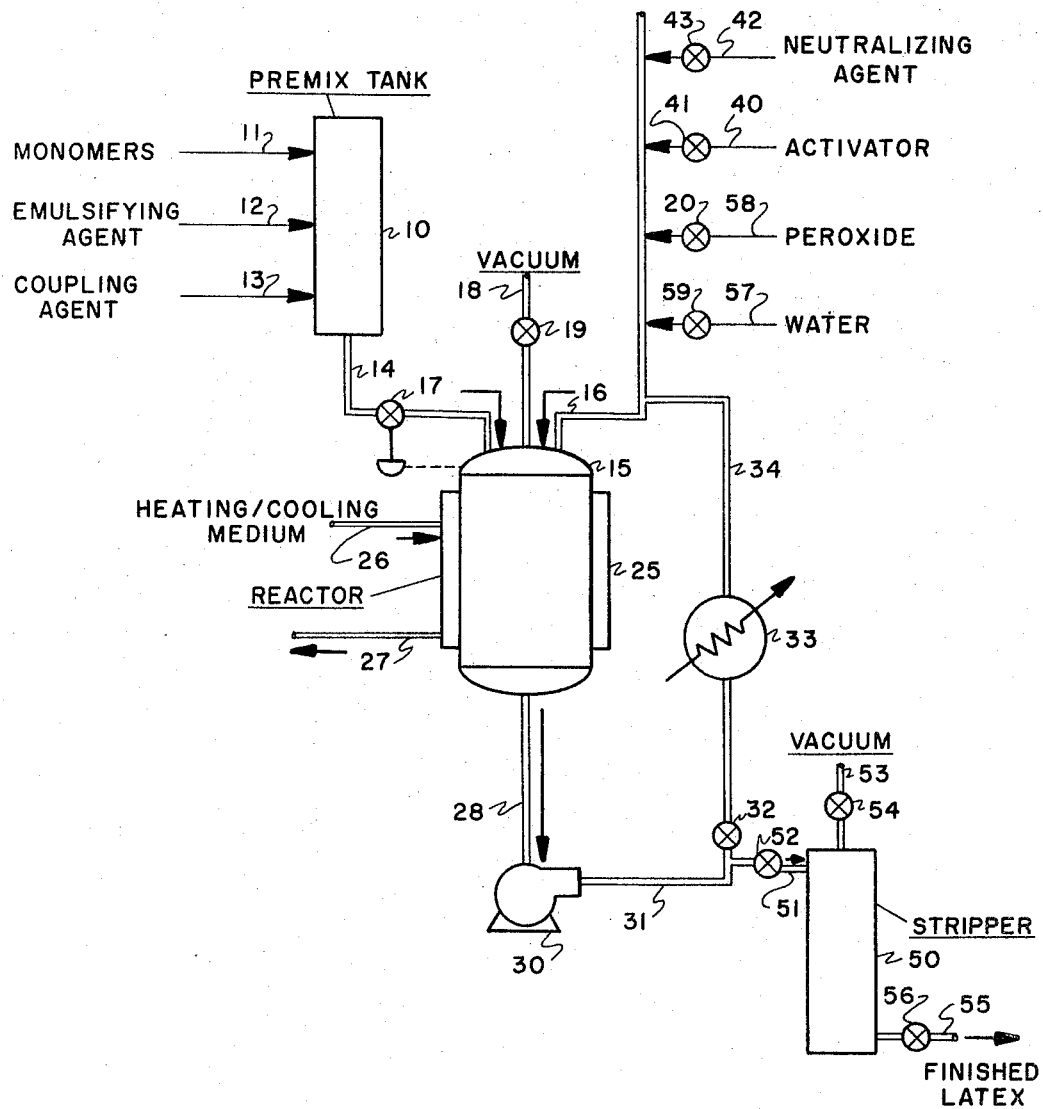

3,317,449
POLYVINYLIDENE CHLORIDE LATEX
AND PROCESS
Philip K. Isaacs, Silver Spring, Md., Dudley G. Woodard, Washington, D.C., and Alexei Trofimow, Brookline, and Donald M. Wacome, Bedford, Mass., assignors to W. R. Grace & Co., Cambridge, Mass., a corporation of Connecticut
Filed Apr. 19, 1966, Ser. No. 549,743
12 Claims. (Cl. 260—29.6)

This application is a continuation-in-part of application Ser. No. 132,119, filed Aug. 17, 1961 now abandoned.

This invention pertains to a process for the preparation of an improved polyvinylidene chloride latex characterized by its high solids content, low viscosity, and exceptional mechanical stability. The particles in the latex are large and uniform in size and form what might be termed a monodespersed system. This latex forms films having excellent gas and moisture barrier properties and good flexibility without the use of external plasticizers. The films laid down from this latex can also be rewet by a second coating of the latex. This latex is useful for coating papers such as krafts to form wrapping papers and the like.

Polyvinylidene chloride latices have been prepared in the past by emulsion polymerization of the constituent monomers in the presence of a water-soluble free-radical producing initiator and an emulsifying agent. The latices obtained usually had a relative high viscosity and/or low solids content, because of the small and non-uniform size of the polymer particles. The art has been unaware that stable, low viscosity, high polyvinylidene chloride content latices could be produced. High solids content polyvinylidene chloride latices are inherently unstable, and this may have discouraged the manufacture of such latices.

The present invention is based on the finding that a high solids content polyvinylidene chloride latex can be prepared by careful control of the emulsion polymerization process, principally by control of the initial concentration of nucleating micells in the water phase, and the subsequent rates of monomer and emulsifying agent addition. The reaction proceeds quite smoothly, and total solids levels greater than 65 weight percent are readily achieved.

In brief compass this invention is an improvement of a process for the preparation of a polymer latex, wherein the polymer comprises at least 80 or more percent of vinylidene chloride monomer, and wherein the constituent monomers are emulsified in water in a reaction zone in the presence of an emulsifying agent and polymerized through the agency of a water-soluble polymerization initiator. The improvement of this invention comprises adding the monomers and emulsifying agent continuously to the reaction zone during the course of the reaction, while maintaining the weight ratio of the added monomer to the added emulsifying agent substantially constant and while maintaining the conversion of monomers in the reaction zone above 80 weight percent at any time after initiation of the reaction.

It is particularly preferred in the improved process of this invention to maintain the reaction zone at a substantially constant pressure and temperature throughout the course of the reaction and to add the monomers responsive to the pressure, which results in an increasing rate of monomer addition during the course of the reaction.

The reaction is initiated by first adding sufficient monomer and an emulsifying agent to the water phase, which contains the initiator such as a peroxide, to cause the concentration of the emulsifier in the water phase to be slightly above its critical micell formation concentration which is usually in the range of 0.2 to 0.5 weight percent based on the weight of the water per se. If the free-radical producing initiator requires an activator, the activator can be added at this point.

This invention will become clear from the following discussion and example, made with reference to the attached drawing which schematically depicts a semi-batch process operated in accordance with the teachings of this invention.

By a polyvinylidene chloride polymer is meant a polymer at least 80 weight percent of which, preferably at least 90 weight percent, is composed of the vinylidene chloride monomer. Monomers that can be copolymerized with vinylidene chloride to improve the flexibility of the resin are vinyl esters, alkyl vinyl ethers and acrylate and methacrylate esters. Such monomers are usually used in the amounts of 5 to 20 weight percent on total resin. Other monomers that can be used to improve other properties such as latex film consolidation, adhesiveness and toughness are acrylic acid, itaconic acid, aconitic acid, acrylonitrile and methacrylonitrile. These monomers are usually used in amounts in the range of 1 to 10 weight percent on total resin.

The monomers are copolymerized by adding them in the correct proportions to a water phase maintained at the desired polymerization pressure and temperature. The monomers are added at a controlled rate to prevent the monomers conversion in the reaction zone at any instant of time after initiation from falling below 80 weight percent. The presence of excess monomer in the reaction zone leads to high latex viscosities and/or coagulum and is undesirable. A redox system or thermally activated initiator can be used to initiate and maintain the reaction. Initiator systems that can be used are:

| Free-radical producers: | Activators therefor |
|---|---|
| Sodium persulfate | Sodium bisulfite. |
| Potassium persulfate | Potassium bisulfite. |
| Ammonium persulfate | p-Toluene sulfinic acid. |
| Hydrogen peroxide | Soluble ferrous or ferric salts, such as chloride and nitrates. p-Toluene sulfinic acid. |
| Organic hydroperoxides such as tertiary butyl hydroperoxide and peracetic acid | Heat activated. |
| Benzoyl peroxide | Heat activated. |

All of these systems are familiar to the skilled in the art. The emulsifying agent is continuously added to the water phase during the course of the reaction, with the monomer or separately therefrom. The emulsifying agent should not be added all at once to the water phase because this leads to small sized particles. The amount used at the initiation of the reaction should only slightly exceed the critical concentration, for the temperature and pressure being used, at which micells are formed so that only a relatively few nucleation sites are created. The emulsifier is thereafter added in amounts sufficient to adequately suspend the growing polymer particles, but the addition rate is low enough so that few, if any, new micells are formed. One type of emulsifying agent can be used to initiate the reaction and another type can be used for the purpose of suspending the particles after they are formed. Suitable emulsifying agents are sodium lauryl sulfate, sodium dioctyl sulfosuccinate and sodium dihexyl sulfosuccinate. It is particularly preferred to use the alkali metal alkylaryl sulfonates having 3 to 20 carbon atoms in any one alkyl chain, 1 to 3 aromatic or ring nucleuses and 1 to 4 alkyl chains per molecule.

It is much preferred to mix the monomers with the emulsifying agent prior to introducing them into the water phase. This assures that the ratio of emulsifying agent to monomer will be constant and simplifies metering of the materials. The necessary mixture can be made by simply well agitating the two materials and maintaining agitation to prevent separation. It is preferred, however, to use a coupling agent to form a stable mixture that will not separate on standing. Suitable coupling agents are glycerine, water, acrylic acid, and methanol. The coupling agents will normally be used in amounts of 0.1 to 4 weight percent based on the weight of the monomers.

*Example*

It is preferred to form the latex from vinylidene chlorine, acrylonitrile and butylacrylate in the ratio of 1:0.02 to 0.05; 0.05 to 0.09 part by weight respectively as superior films are obtained. For the purpose of this example, 1 part by weight of vinylidene chloride is used with 0.033 part of butylacrylate and 0.077 part of acrylonitrile.

With reference to the drawing, the monomers are charged to an agitated premixed tank 10 by line 11. The amount of monomer used is sufficient to give 50 to 70 weight percent solids in the finished latex, e.g., 67 weight percent. The emulsifying agent, sodium dodecyl benzene sulfonate, about 47 weight percent solids, is added by line 12 and the coupling agent, 98 percent acetic acid, is added by line 13. The soap amounts to about 4.0 parts by weight (as solid) on monomer and the coupling agent about 0.25 part by weight on monomer. After being thoroughly agitated to form a stable mixture, the mixture is introduced by line 14 into the water phase in reaction zone 15.

The water phase is prepared at the time the premix is prepared. Water is introduced into the reaction zone from line 57 which contains shut off valve 59. The water is thoroughly purged after heating to the reaction temperature to reduce the free oxygen to negligible proportions. This is done by applying vacuum through line 18 which contains shut off valve 19. The initiator, hydrogen peroxide (35 weight percent water solution), is then introduced by line 58 which contains shut off valve 20. The concentration of the peroxide in the water phase at this point is about 0.0046 weight percent.

The water phase is heated to the desired reaction temperature by a heating jacket 25 surrounding reaction zone 15 with the heating medium being introduced by line 26 and removed by line 27. In the later stages of the reaction, jacket 25 can be used to cool the reaction zone if this is necessary. During the course of the reaction, a recycle-heat exchange system is also used to maintain good temperature control. This system comprises a bottom draw off line 28, a recycle pump 30, line 31 with shut off valve 32, heat exchange at 33 and line 34 which leads into line 16.

A sufficient mixture of monomer and soap is added to the reaction zone after the water phase has been prepared and heated to cause the emulsifier concentration to slightly exceed the concentration at which micells are formed, which for the conditions of this example (122° F., 9 p.s.i.a.) is about 0.275 weight percent soap, based on the water per se in the reaction zone. The pressure might slightly exceed the desired reaction pressure at this point. The number of micells created give sufficient polymerization sites to start the reaction at a good rate.

If a heat-activated initiator is used, the reaction will start by itself after the micells have formed. In this case an activator is used. The reaction is started, after the initial pressuring with the soap-monomer mixture, by introducing a portion of the activator, $FeCl_3$, from line 40 which contains shut off valve 41. The activator is continuously added as a water solution (0.03 weight percent $FeCl_3$) at a constant rate over a major portion of the reaction, i.e., until the solids content reaches 30 to 55 weight percent, e.g., 42 weight percent. The amount of ferric chloride used (as 100 percent $FeCl_3.6H_2O$ solid) in this example is 0.0054 part per weight per part of peroxide.

After the reaction has been initiated, the introduction of monomer-soap mixture is preferably controlled responsive to the pressure in the reaction zone by means of pressure actuated valve 17, in line 14, set to maintain the pressure. Other means of controlling the addition of the monomer-soap mixture can be used, of course. It can be appreciated that the control of the monomer-soap addition responsive to the reaction zone pressure requires that temperature of the system be relatively stable. With this method of control, the rate of monomer addition continuously increases over the course of the reaction because the monomers are consumed at an ever increasing rate. The pressure used is usually high enough to get good reaction rates, but low enough to avoid flooding with monomer which leads to a high viscosity product. The pressure will usually be in the ranges of 5 to 30 p.s.i.g.

The rate of addition of monomer is such that the monomer conversion level in the reaction zone is maintained above 80 weight percent at all times. The reaction is continued in this manner for a few hours until the monomer supply is exhausted and the reaction zone pressure drops to about atmospheric. The amount of soap present at this point is 3 to 6 weight percent which is sufficient to adequately suspend the particles. The amount of unreacted monomer present is usually below 2 weight percent based on total solids in the reaction mixture.

A surprising feature of the latex of this invention is the remarkable uniformity of the particle size. The latex is essentially a mono-dispersed system. While the distribution curve (size of particles plotted versus number) does have some spread, 90 percent of the particles have a size that falls within 800 A. on either side of the average particle size of the particles. The average particle size is in the range of 1500 to 2500 A., preferably 1800 to 2400 A., as determined by electron microscopy. The viscosity of the latex as produced is in the range of 20 to 40 centipoises (Brookfield, #1 spindle, 25° C., 60 r.p.m.) at 60 weight percent solids.

The completed latex at this point could be used as such, but it is desirable to buffer it to a pH of 4 to 5 and to strip it to remove unreactive monomers which impart an odor. Thus a tetrasodium pyrophosphate solution (4 weight percent in water) is added via line 16 from line 42 having shut off valve 43 in amounts sufficient to bring the pH to 5. Additional water is also added from line 52 to reduce the solids content to 30 weight percent to prepare the latex for stripping.

The latex is removed from the reaction zone, via pump 30 in line 31, and passed to a stripping unit or evaporator 50 through line 51 which contains shut off valve 52. The latex in the evaporator is heated in this example to about 80° F. by means not shown. Vacuum, e.g., 1.2 p.s.i.a., is applied to the stripping unit by line 53 having shut off valve 54. Water is removed along with the unreacted monomer by line 53. The latex leaves the stripper by line 55 having shut off valve 56 at a solids content of 55 to 70, e.g., 63 weight percent and may be sent to packaging or storage.

Table I gives the inspections of the neutralized and stripped latex produced as described above.

TABLE I

| | |
|---|---|
| Avg. particle size, A. Ca | 2200 |
| Size distribution, 90 wt. percent of particles, A. | 1600–2800 |
| Surface tension (Du Nouy) dynes/sq. cm. at 23° C. | 34 |
| Wt. percent soap, on solids | 3.83 |
| Viscosity, cps. (Brookfield, #1 spindle, 25° C., 60 r.p.m.), at 60% solids | 26 |
| pH | 5 |

TABLE I—Continued

| | |
|---|---|
| Wt. percent solids | 61 |
| Mechanical stability [1] | 0.05 |
| Softening range of resin ° C. (Fisher-Johns) | 90–120 |
| Wt. percent Cl in resin | 63 |
| Wt. percent N in resin | 0.8 |
| Average molecular weight of resin (by light scattering method) | 175,000 |

[1] Shear 100 cc. of latex in standard Hamilton Beach blender for one hour, then screen through 100 mesh screen. Dry screen in oven for 30 minutes at 140° C. The number reported is:

$$\frac{\text{(weight coagulum on screen)}}{100 \text{ cc.} \times 1.3 \times \text{wt. percent solids}} \times 100$$

The mechanical stability is considered to be satisfactory if the number is less than 0.50.

The above-described latex can be coated with an air knife coater under commercial conditions on a 60 pound ream weight (500–24 x 30″ sheets) sulfite kraft paper. Its high solids content reduces drying time considerably. The resulting film is well bonded to the paper and very flexible. The coated paper is an excellent wrapper for fatty goods such as meats.

Having described this invention, what is sought to be protected by Letters Patent is succinctly set forth in the following claims.

What is claimed is:

1. In the preparation of a polymer latex wherein the polymer comprises 80 to 95 weight percent of vinylidene chloride monomer and wherein the constituent monomers are emulsified in water in a reaction zone in the presence of an emulsifying agent and polymerized through the agency of a polymerization initiator, the improvement comprising adding said monomers and emulsifying agent continuously to said reaction zone during the course of the reaction while maintaining the weight ratio of the added monomers to the added emulsifying agent substantially constant and while maintaining the conversion of monomers in said reaction zone above 80 weight percent at any time after initiation of the reaction, said latex having a viscosity in the range of 20 to 50 cps. (Brookfield #1 splindle, 60 r.p.m. at 25° C.) as measured at 60 weight percent solids, said latex having a solids content above 55 percent.

2. In the preparation of a polymer latex wherein the polymer comprises 80 to 95 weight percent of vinylidene chloride monomer and wherein the constituent monomers are emulsified in water in a reaction zone in the presence of an emulsifying agent and polymerized through the agency of a polymerization initiator, the improvement comprising adding said monomers and emulsifying agent continuously to said reaction zone during the course of the reaction while maintaining the weight ratio of the added monomers to the added emulsifying agent substantially constant and while maintaining the conversion of monomers in said reaction zone above 80 weight percent at any time after initiation of the reaction, said latex having an average particle size in the range of 1500 to 2500 A. with 90 percent thereof falling in a range within 800 A. on either side of said average particle size, said latex having a viscosity in the range of 20 to 50 cps. (Brookfield #1 spindle, 60 r.p.m. at 25° C.) as measured at 60 weight percent solids, said latex having a solids content above 55 percent.

3. The process of claim 2 wherein said reaction zone is maintained at a constant pressure and temperature throughout the course of the reaction, and said monomers are added responsive to said pressure and at an increasing rate during the course of the reaction.

4. The process of claim 3 wherein the reaction is initiated by first adding sufficient monomers and emulsifying agent to the water phase containing said initiator and the concentration of said emulsifier in the water is slightly above its critical micell formation concentration.

5. The process of claim 4 wherein said emulsifying agent is an alkali metal alkylaryl sulfonate, and said critical micell formation concentration is in the range of 0.2 to 0.5 weight percent.

6. The process of claim 2 wherein said monomers consist of vinylidene chloride, acrylonitrile and butylacrylate in the weight ratio of 1:0.02 to 0.05:0.05 to 0.09, respectively.

7. The process of claim 2 wherein said reaction is continued until the solids content of the reaction mixture exceeds 65 weight percent.

8. The process of claim 2 wherein said monomers and emulsifying agent are mixed with a coupling agent to form a stable mixture prior to their addition to the reaction zone.

9. A vinylidene chloride copolymer latex having a solids content above 55 weight percent, comprising water, an emulsifying agent and particles of vinylidene chloride copolymer, wherein said copolymer is a terpolymer of vinylidene chloride, acrylonitrile, and butyl acrylate in the weight ratio of 1:0.02 to 0.05:0.05 to 0.09, said particles having an average particle size in the range of 1800 to 2400 A. with 90 percent thereof falling in a range within 800 A. on either side of said average particle size and said latex having a viscosity in the range of 20 to 40 cps. (Brookfield #1 spindle, 60 r.p.m., 25° C.), as measured at 60 weight percent solids, and a mechanical stability test value of less than 0.50.

10. The latex of claim 9 wherein said emulsifying agent is an alkali metal alkylaryl sulfonate and is present in the amount of 3 to 6 weight percent and wherein dry films cast therefrom can be rewet by a second coating of the latex.

11. A packaging material comprising a substrate and a film bonded to said substrate, said film being deposited from a vinylidene chloride copolymer latex having a solids content above 55 weight percent, comprising water and emulsifying agent and particles of vinylidene chloride copolymers wherein said copolymer is a terpolymer of vinylidene chloride, acrylonitrile, and butyl acrylate in the weight ratio of 1:0.02 to 0.05:0.05 to 0.09, said particles having an average particle size in the range of 1800 to 2400 A. with 90 percent thereof falling within a range of 800 A. on either side of said average particle size and said latex having a viscosity in the range of 20 to 40 cps. (Brookfield #1 spindle, 60 r.p.m., 25° C.) as measured at 60 weight percent solids and a mechanical stability test value of less than 0.50.

12. The packaging material of claim 11 wherein said emulsifying agent is an alkyl metal alkylaryl sulfonate and is present in the amount of 3 to 6 weight percent and wherein dry films cast therefrom can be rewet by a second coating of the latex.

No references cited.

MURRAY TILLMAN, *Primary Examiner.*

P. LIEBERMAN, *Assistant Examiner.*